United States Patent

Edwards et al.

[11] Patent Number: 5,101,531
[45] Date of Patent: Apr. 7, 1992

[54] WINDSHIELD WITH SELF LOCATING WIPER PARK RAMP

[75] Inventors: Ralph W. Edwards, Shelby Township, Macomb County; Howard L. Kelley, Troy, both of Mich.

[73] Assignee: General Motors Corporation, Detroit, Mich.

[21] Appl. No.: 657,054

[22] Filed: Feb. 19, 1991

[51] Int. Cl.⁵ .......................... B60S 1/02; B60S 1/04
[52] U.S. Cl. ................... 15/250.19; 15/250.16; 296/192
[58] Field of Search ........... 15/250.19, 250 R, 250.16, 15/250.17, 250.20, 250.21, 250.23; 296/192, 194

[56] References Cited

U.S. PATENT DOCUMENTS

| | | | |
|---|---|---|---|
| 1,869,551 | 8/1932 | Earl | 15/250.16 |
| 2,284,844 | 6/1942 | Rappl | 15/250.19 |
| 3,019,468 | 2/1962 | Hatch | 15/250.19 |
| 3,110,920 | 11/1963 | Dongler | 15/250.16 |
| 4,040,141 | 8/1977 | O'Steen | 15/250.19 |
| 4,310,943 | 1/1982 | Polma | 15/250.19 |
| 4,345,352 | 8/1982 | Terabayashi | 15/250.16 |
| 4,765,019 | 8/1988 | Ochino | 15/250.19 |
| 4,969,228 | 11/1990 | Edwards | 15/250.19 |

FOREIGN PATENT DOCUMENTS

| | | | |
|---|---|---|---|
| 0253696 | 1/1988 | European Pat. Off. | 15/250.19 |
| 2326251 | 12/1974 | Fed. Rep. of Germany | 15/250.19 |
| 63532 | 4/1983 | Japan | 15/250.19 |
| 63551 | 4/1983 | Japan | 15/250.19 |
| 100035 | 6/1984 | Japan | 15/250.19 |
| 50854 | 3/1986 | Japan | 15/250.19 |
| 60354 | 3/1986 | Japan | 15/250.19 |

Primary Examiner—Harvey C. Hornsby
Assistant Examiner—Gary K. Graham
Attorney, Agent, or Firm—Patrick M. Griffin

[57] ABSTRACT

Separable wiper lifting park ramps are attached to a vehicle body cowl panel after windshield installation through a cooperating installation track on the cowl panel and track follower on the ramp. A set of ratchet teeth are engaged as the ramp is pushed home toward the windshield surface. When the ramp hits the windshield, it stops, and cannot back out. Therefore, the ramp is always set accurately relative to the windshield, regardless of any variations between the cowl panel and windshield.

3 Claims, 4 Drawing Sheets

WINDSHIELD WITH SELF LOCATING WIPER PARK RAMP

BACKGROUND OF THE INVENTION

This invention relates to vehicle windshields and wipers generally, and specifically to the type of blade lifting ramp found in patents classified in US class 15/250.19.

Vehicle windshield wipers engage the surface of the windshield with a fair degree of wiping pressure, which it is beneficial to relieve when the windshield wiper is stopped or "parked". This prevents the blade from taking a set over time. Typically, a park ramp is located near the park position of the wiper that hits and lifts the wiper arm, thereby pushing the blade up and off the glass to relieve the pressure on it.

Several interdependent considerations determine where such park ramps are located relative to the vehicle body and windshield. The park position of the wiper arm differs with vehicle designs, but is almost always near the lower edge of the windshield. In some cases, the wiper rests directly over the windshield surface, while in other designs the park position is below the lower windshield edge. Clearly, some part of the ramp must cross the path of the wiper as it moves to park in order to engage and lift it. Therefore, if the wiper rests directly over the windshield, the park ramp must extend over the windshield as well.

Wherever located, the ramp must be physically installed to some part of the vehicle body. The vehicle body has a flanged opening into which the windshield is installed, often with a peripheral bead of urethane adhesive. The installed position of the windshield's lower peripheral edge, both lateral and perpendicular, can vary, due to ordinary tolerances in the flanged opening and adhesive bead. The ramp may be installed directly to the body sheet metal, or to a trim piece surrounding the window, as is shown in older vehicle designs. More modern vehicle designs typically have a separate cowl panel with a flange that overlaps the lower edge of the windshield opening, and the park ramps are often affixed to it, or even made integral with it, rather than separable. The cowl panel is relatively long and narrow, and is often relatively thin, as well. Therefore, its installed position may also vary relative to the installed position of the upper surface of the windshield, as there is generally nothing to tie them directly together. Consequently, the position of the ramp relative to the wiper, which does follow the windshield surface rigorously, may also vary. In the potential worst case variation of lowest windshield surface and highest ramp, the lifting of the wiper at park may not occur as smoothly, and quietly as desired.

Another concern, in the case where the wiper and park ramp both overlay the windshield, is ease of windshield installation. It is desirable to lap the lower edge of the windshield over the cowl flange. This gives a shingling effect for shedding water, and leaves no gap between the two that would otherwise have to be covered. However, if the ramp extends over the windshield and is not separable, the windshield will have to be dropped in behind the ramps as it is installed. This is a more complex assembly motion than just moving the windshield straight down into the opening, and is more difficult to automate.

SUMMARY OF THE INVENTION

The invention provides a cowl assembly in which a park ramp that extends over the windshield is installed to the cowl panel in such a way as to self locate directly to the windshield surface, accommodating any tolerance variations. In addition, the windshield overlaps the cowl but can still be installed with a simple, straight in motion.

In the embodiment disclosed, a vehicle body has a conventional windshield opening and a cowl panel with a flange that overlaps the lower edge of the opening, so that the lower edge of the windshield overlaps the cowl panel, when installed. The cowl panel also includes a pair of ramp installation tracks in the form of T shaped slots that are close to, but outboard of, the installed position of the windshield lower edge. This allows the windshield to be installed with a straight in motion, as there is nothing on the cowl panel initially to interfere. A pair of separable park ramps each has a track follower in the form of a rib and trunnion that drop through and slide down into a respective slot. As each ramp is pushed toward the windshield, it engages a ratchet means comprised of a line of one way teeth. Eventually, each ramp hits the upper surface of the windshield, stops, and cannot back out. Despite any variations in the relative cowl panel and windshield locations, the park ramp self locates to the windshield. In addition, since the windshield lower edge is firmly sandwiched between the cowl panel flange and the park ramps, cowl panel receives some additional structural rigidity therefrom, and the three together interact to create a stronger structure.

It is, therefore, a main object of the invention to provide a cowl assembly for a windshield installation that self seats and self locates to the windshield surface so as to compensate for any tolerance variations.

It is another object of the invention to provide such an assembly in which the park ramps overlap the windshield without limiting installation of the windshield.

It is another object of the invention to provide such an assembly in which cooperating slots and ratchet teeth on the park ramps and cowl panel automatically position the park ramp at the proper height relative to the windshield.

It is yet another object of the invention to provide a cowl panel and park ramp that cooperate to draw additional structural stiffness from the windshield.

BRIEF DESCRIPTION OF THE DRAWINGS

These and other objects and features of the invention will appear from the following written description, and from the drawings, in which.

DESCRIPTION OF THE PREFERRED EMBODIMENT

Figure 1:
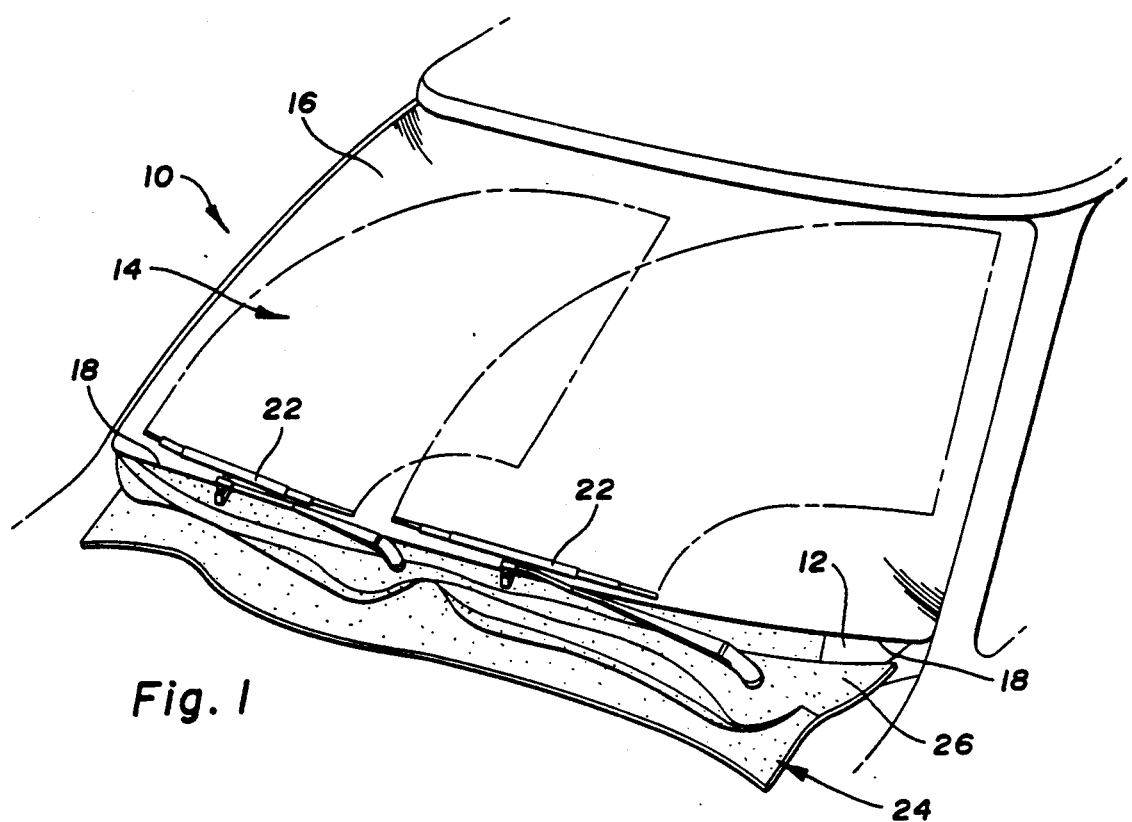
FIG. 1 is a perspective view of part of a vehicle body with the windshield installed, showing the exposed cowl panel and the wipe pattern of the wipers.
Figure 5:
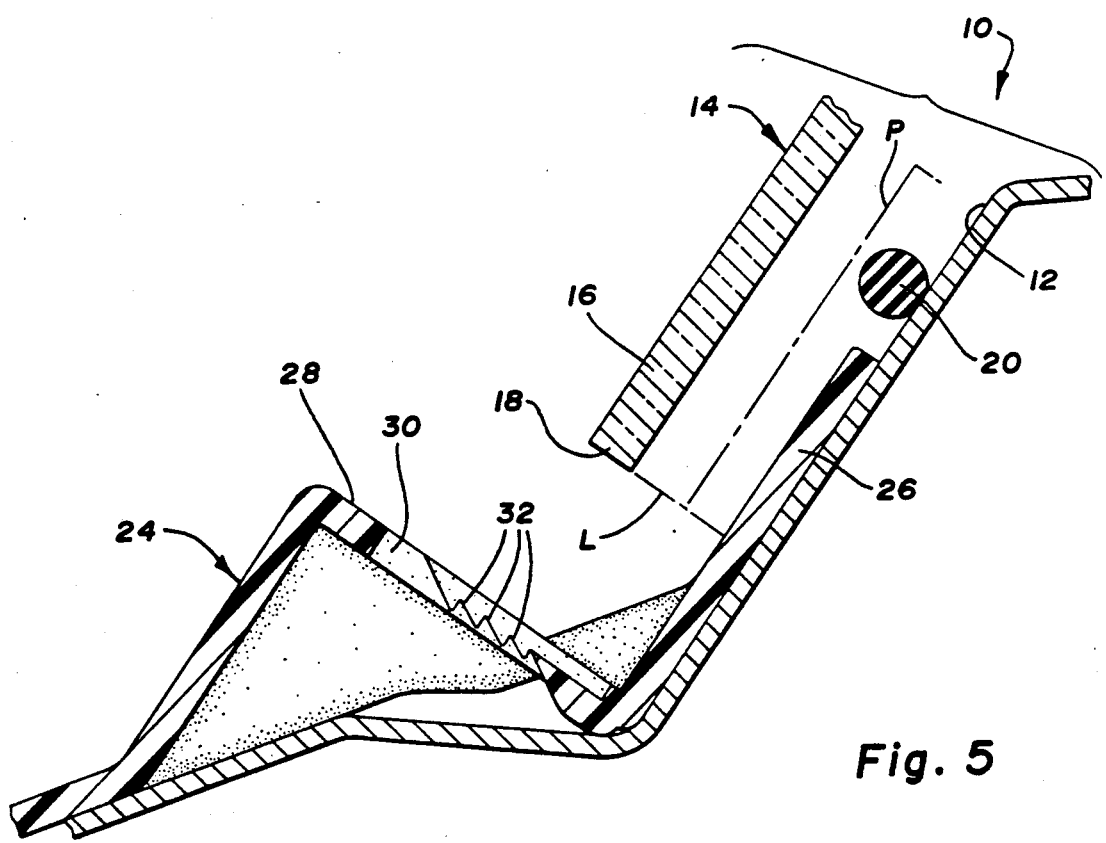
FIG. 5 is an enlarged cross sectional view of a ramp installation slot and the lower edge of the windshield overlaying the cowl panel and the edge of the window opening.

Referring first to FIGS. 1 and 5, a preferred embodiment of the invention is shown incorporated in a vehicle body, indicated generally at 10. The sheet metal of vehicle body 10 has a continuous pinchweld flange that defines a generally rectangular windshield opening 12. Given the nature of sheet metal forming and the size of the opening 12, the final build location of the edge of opening 12, measured relative to a fixed reference frame, is expected to vary within normal manufacturing tolerances. A conventional windshield, indicated generally at 14, has an upper surface 16 and a peripheral lower edge 18. As shown in FIG. 5, windshield 14 is installed into opening 12 with a bead 20 of urethane adhesive. Once bead 20 has been laid down, it is easiest and quickest to drop windshield 14 straight down into opening 12, that is, to move it along a path generally perpendicular into opening 12. The nature of the installation process also means that the final or post installation location of windshield 14, both the lateral position of lower edge 18 measured laterally of opening 12, and the position of upper surface 16 measured perpendicular to opening 12, will vary somewhat. Nevertheless, that final build position of windshield 14, shown by the dotted lines labeled L and P, is determined and limited by opening 12, at least within the expected tolerances, and the designer must work within those limitations. A pair of conventional wipers 22 sweep over upper surface 16 in the arcuate patterns shown. The wipers 22 follow the windshield surface 16 when they move, and stop at a lowermost or park position in which they overlay upper surface 16, close to and generally parallel to lower edge 18.

Referring next to FIGS. 1 and 5, cowl panel, indicated generally at 24, is long, narrow and relatively thin, consisting of a plastic molding in this case. Cowl panel 24 serves numerous functions not directly related to the invention here, including the fresh air screen for the vent system, and it is a convenient mounting base for the wipers 22 and other structures connected with the total wiper and washer system. Cowl panel 24 has an upper flange 26 which extends up and over the lower edge of opening 12, beyond the post installation position L of windshield lower edge 18. As such, as best seen FIG. 5, cowl panel 24 is installed to vehicle body 10 before windshield 14, which overlays flange 26. This is an advantage in that there is no gap between the two to admit water, or that needs to be covered for aesthetic reasons. Although the flange 26 of cowl panel 24 underlies the lower edge of windshield 14, there is nothing to tie the two structurally together, or to assure the accuracy of their post installation locations relative to each other.

Figure 2:
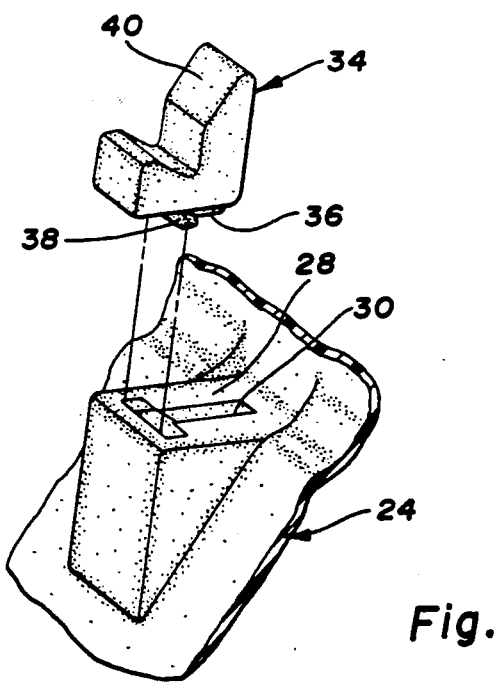
FIG. 2 is a perspective view showing a ramp installation slot on the cowl panel, and showing a park ramp removed therefrom.
Figure 3:
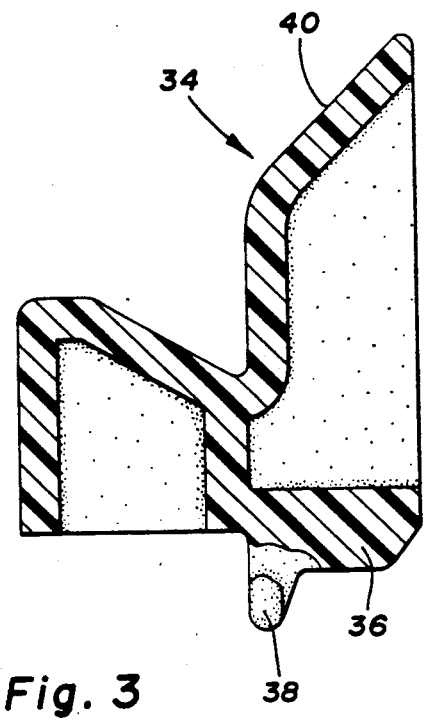
FIG. 3 is a cross sectional view of a park ramp showing the tee in elevation.
Figure 4:
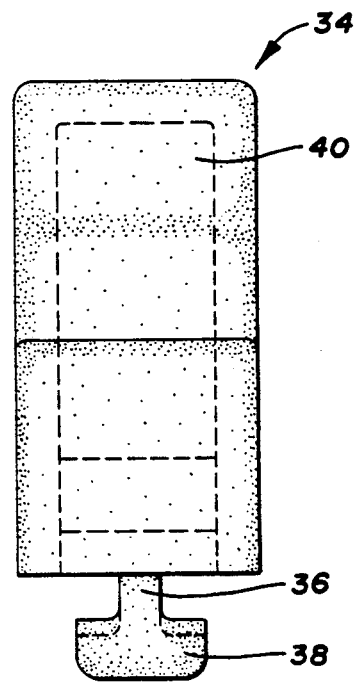
FIG. 4 is a front view of a park ramp.

Referring next to FIGS. 2 and 5, an additional structural feature and purpose of cowl panel 24 is illustrated. A pair of localized hollow protrusions molded into panel 24 present flat surfaces 28 that are oriented generally perpendicular to windshield surface 16, and well outboard of lower edge 18's lateral post installation location L. Cut through each surface 28 is a T shaped slot 30. Molded behind and to either side of the length of slot 30 is a series of saw shaped, asymmetrical ratchet teeth 32, the shallower slope of which extends toward the flange 26. The remaining component of the invention is a pair of park ramps, one of which is indicated generally at 34. Each park ramp 34 is an injection molded plastic piece, molded of a generally harder material than cowl panel 24. Integrally molded to the bottom of each ramp 34 is a rib 36 sized to fit slidably within the length of T slot 30, and a trunnion 38 on rib 36 that is sized to drop through the width of T slot 30. The back edge of trunnion 38 is sharp, so as to engage the ratchet teeth 32, as described below. Finally, each ramp 34 has a wedge 40 which, after it has been installed, is long enough to extend over windshield surface 16 and to cross the path of wiper 22 as it moves to park, as described next.

Figure 6:
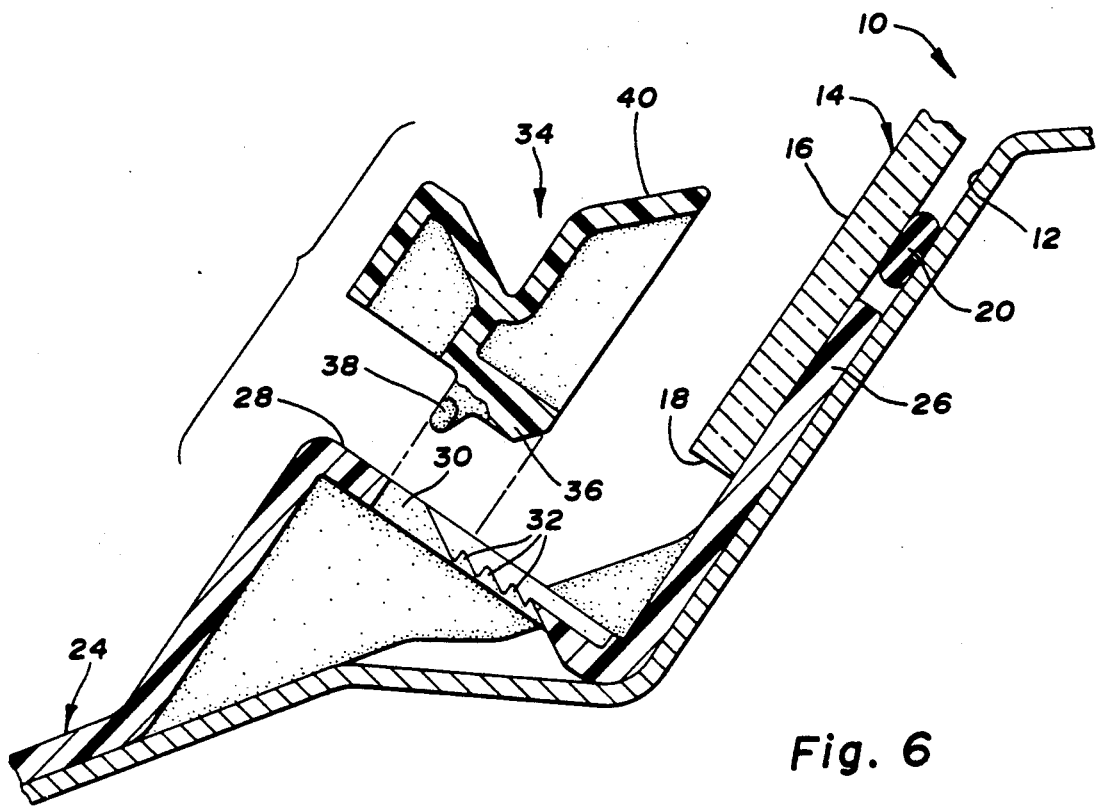
FIG. 6 is a view like FIG. 5, but showing a park ramp aligned with the installation slot.
Figure 7:
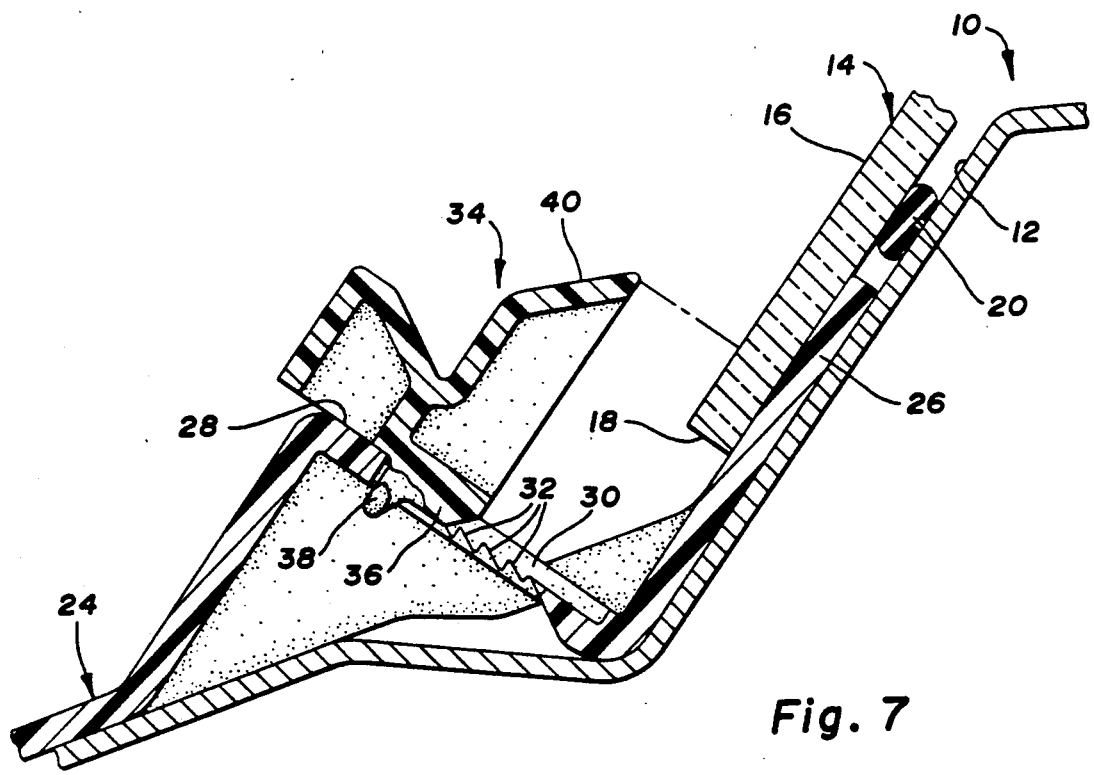
FIG. 7 is a view like FIG. 6, but showing the park ramp tee inserted in the installation slot.
Figure 8:
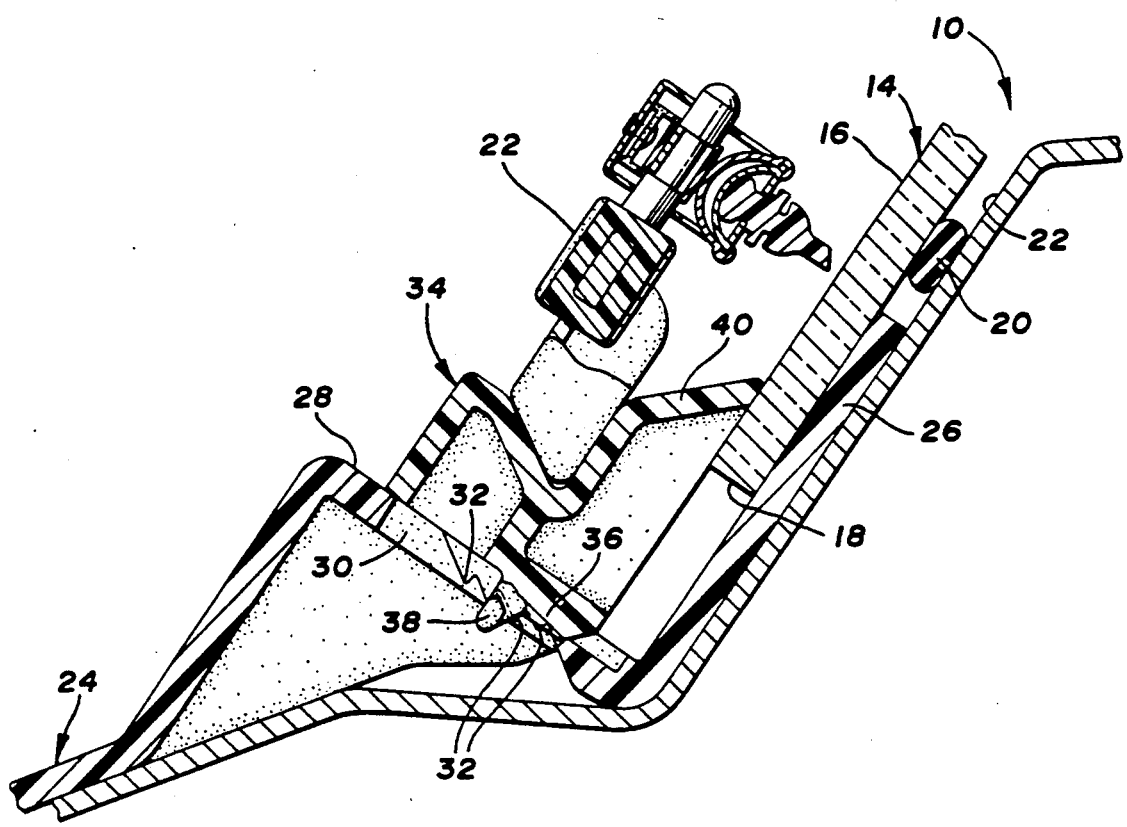
FIG. 8 is a view like FIG. 7, but showing the park ram fully installed against the windshield, and showing the position of a wiper when parked.

Referring next to FIGS. 5 through 8, the installation of a park ramp 34 is illustrated. Windshield 14 has already been installed, overlapping flange 26. Because the flats 28 are well outboard of L, windshield 14 can be installed freely, by the most economical perpendicular path, as described above. Next, as shown in FIG. 6, a trunnion 38 is dropped through the width of T slot 30 simultaneously with rib 36 passing through its length. Then, ramp 34 is pushed down, sliding along flat 28 toward windshield surface 16 as rib 36 follows the guiding track provided by slot 30. Eventually, the sharp back edge of trunnion 38 engages the ratchet teeth 32, snapping past them seriatim, so that it cannot back out. Ramp 34 can be pushed down only until wedge 40 hits windshield upper surface 16, as shown in FIG. 8, a stopping point that the installer will easily sense. Teeth 32 are configured according to the expected tolerance variation in the post installation position of windshield 14. That is, teeth 32 are sufficient in number to assure that some will be engaged by trunnion 38 as ramp 34 is pushed home. Thus, it is assured that wedge 40 will be tight to surface 16, with no gaps, no matter how the vertical position P of surface 16 varies. It is thereby assured that the lifting of wiper 22 thereby will be smooth. In the particular embodiment disclosed, windshield 14, is firmly and rigidly fixed into opening 12 by the continuous bead 20. Cowl panel 24, on the other hand, is most securely attached to body 10 at its ends, but has less support in the middle. However, cowl panel 24 receives extra support and structural stiffness from windshield 14 because of the fact that edge 18 is trapped between the ramps 34 and flange 26. Thus, cowl panel 24, windshield 14 and the ramps 34 all interact and cooperate to provide an improved total structure.

Variations of the disclosed embodiment could be made. The primary advantage of the invention is the self locating, tolerance compensating action created by making the park ramp separable and installing it with the installation track and cooperating ratchet means. In a vehicle body design that did not have a separate cowl panel, installation tracks like 30 could be incorporated directly in the vehicle body itself, near the installed position of lower edge 18. It is practically easier to provide the tracks 30 in a cowl panel, however. If the installation tracks, wherever incorporated, were not located outboard of the post installation position of the windshield's lower edge, then the windshield could not be installed with the simple, straight in motion described, since it would have to be dropped in behind the installation tracks first. However, that might not be a disadvantage where the tracks were themselves part of a rigid structure, and would allow the windshield to be set down and tipped in like a sliding door in a track. If the cowl panel did not have the flange 26 that under lay the windshield, then it would not be possible to completely clamp the cowl panel to the edge of the windshield as the ramp was pushed home. Again, that would not matter so much where the cowl panel was inherently stiffer. Therefore, it will be understood that it is not intended to limit the invention to just the embodiment disclosed.

We claim:

1. In combination with a vehicle body having a windshield with an upper surface and a peripheral edge and a windshield wiper engageable with said upper surface with a predetermined park position proximate said windshield peripheral edge, a park ramp assembly, comprising, an elongated ramp installation track incorporated in said vehicle body proximate said windshield peripheral edge and extending generally perpendicular to said windshield upper surface, a separable park ramp having a track follower adapted to slide fit into said installation track and a lifting wedge that extends over said windshield peripheral edge and past said predetermined wiper park position, and, one way ratchet means on said track and follower having a plurality of teeth to assure engagement with said park ramp when said track follower is fitted into said installation track and moved along said tack toward said windshield, said park ramp track follower being fitted into said installation track and moved toward said windshield until said lifting wedge touches said windshield upper surface, thereby assuring that said ramp is properly positioned relative to said windshield so as to engage and lift said wiper as it moves to its park position.

2. For use in a vehicle body having a windshield opening, a windshield adapted to be installed by moving substantially perpendicularly toward and into said opening, said windshield having an upper surface and a peripheral edge with a predetermined lateral and vertical installed position, and a windshield wiper having a predetermined park position proximate said windshield peripheral edge, a cowl panel and park ramp assembly, comprising, a cowl panel installed to said vehicle body prior to said windshield, said cowl panel having an elongated ramp installation track extending generally perpendicular to said opening and located, when installed, outboard of said windshield peripheral edge installed position, a separable park ramp having a track follower adapted to slide fit into said installation track and a lifting wedge that extends over said windshield peripheral edge and past said predetermined wiper park position, and, one way ratchet means on said track and follower engageable when said track follower is fitted into said installation track and moved toward said vehicle body, said cowl panel being installed to said vehicle body before said windshield, after which said windshield being installed along a path generally perpendicular to said opening, after which said park ramp track follower is fitted into said installation track last and moved along said track toward said windshield until said lifting wedge touches said windshield upper surface, thereby assuring that said ramp is properly positioned relative to said windshield so as to engage and lift said wiper as it moves to its park position.

3. For use in a vehicle body having a windshield opening, a windshield adapted to be installed by moving substantially perpendicularly toward and into said opening, said windshield having an upper surface and a peripheral edge with a predetermined lateral and vertical installed position, and a windshield wiper having a predetermined park position relative to said windshield peripheral edge, a cowl assembly, comprising, a cowl panel installed to said vehicle body prior to said windshield, said cowl panel having a flange that underlies said windshield peripheral edge and an elongated ramp installation track extending generally perpendicular to said flange and located, when installed, outboard of said windshield peripheral edge installed position, a separable park ramp having a track follower adapted to slide fit into said installation track and a lifting wedge that extends over said windshield peripheral edge and past said predetermined wiper park position, and, one way ratchet means on said track and follower engageable when said track follower is fitted into said installation track and moved toward said underlying flange, said cowl panel being installed to said vehicle body before said windshield, after which said windshield being installed overlying said cowl panel flange, after which said park ramp track follower is fitted into said installation track last and moved along said track toward said windshield until said lifting wedge touches said windshield upper surface, thereby assuring that said ramp is properly positioned relative to said windshield so as to engage and lift said wiper as it moves to its park position and also trapping said windshield lower edge between said flange and park ramp so as to structurally tie said cowl panel and windshield together.

* * * * *